United States Patent [19]

Kilpatrick et al.

[11] 4,032,565

[45] June 28, 1977

[54] CROSS-LINKABLE COMPOUNDS

[75] Inventors: David John Kilpatrick, Leeds; Trevor Shaw, Ilkley; David Malcolm Lewis, Otley, all of England

[73] Assignee: I.W.S. Nominee Company Limited, London, England

[22] Filed: July 22, 1974

[21] Appl. No.: 490,669

[30] Foreign Application Priority Data

July 27, 1973   United Kingdom ............. 35882/73
July 27, 1973   United Kingdom ............. 35883/73
July 27, 1973   United Kingdom ............. 35884/73

[52] U.S. Cl. ........................... 260/481 R; 8/128 A; 260/471 C; 260/482 C; 260/482 P; 260/484 B; 260/485 G
[51] Int. Cl.$^2$ ..................................... C07C 149/20
[58] Field of Search ......................... 260/481, 75 S

[56] References Cited

FOREIGN PATENTS OR APPLICATIONS

2,059,890   6/1971   Germany
951,934   3/1964   United Kingdom

OTHER PUBLICATIONS

Morrison et al., Organic Chemistry, 2nd ed. (1966), pp. 582–583.

*Primary Examiner*—Anton H. Sutto
*Assistant Examiner*—Michael Shippen
*Attorney, Agent, or Firm*—Dennis P. Clarke

[57] ABSTRACT

Crosslinkable polymers, suitable for use in the finishing of keratinous fibres such as wool, have polyoxyalkylene chains in which the alkylene groups consist of unbranched chains of not less than 3 carbon atoms. The polymer molecule contains at least two groupings capable of crosslinking, for example thiol, isocyanate, or thiosulphate groups, and the molecule also contains at least two carboxylic acid residues at least one of which is the residue of a polycarboxylic acid. The polyoxyalkylene chains are themselves linked at both ends to the rest of the molecule by carboxylic ester linkages. Particularly preferred compounds are water soluble and contain one or more solubilizing groups such as thiosulphate or the bi-sulphite adduct of isocyanate or, in the case of compounds with thiol groups, salt forming carboxylic groups. The compounds may be applied to textile fibres as aqueous emulsions or solutions and may be cured by drying in hot air or by steam. The outstanding advantage of the compounds is their improved light stability as compared with previous crosslinkable polymers based on polyalkylene chains. Textiles treated with improved polymers retain their finished properties after exposure to light and offensive smells sometimes generated by thiol polymers on exposure to light are substantially avoided.

6 Claims, No Drawings

CROSS-LINKABLE COMPOUNDS

This invention relates to polyfunctional crosslinkable compounds and in particular to such prepolymers and polymers having polyoxyalkylene chains.

A number of resins have been proposed for use on wool or other keratinous fibres to confer desirable properties such as shrink-resistance, or shape stabilization. Among such resins are polymers based on a triol residue having polyoxypropylene side chains terminated with radicals containing thiol or isocyanate groups. Prepolymers of this kind can be applied to wool and cured by chain extension and cross linking to provide shrink resistance and permanent press properties.

However, it has been found that the light stability of these types of resin is not always as good as may be desired and the cured polymer may slowly decompose upon exposure to light, giving rise to loss of the above-mentioned desirable properties and, in the case of thiol-containing polymers, to generation of an unpleasant smell. According to the present invention there is provided a curable polymeric compound which contains i. at least two moieties per molecule capable of cross-linking.
ii. Separating each of the crosslinkable moieties, at least one polyoxyalkylene chain having an unbranched chain of not less than three carbon atoms between each oxygen atom; and
iii. at least two carboxylic acid residues including at least one polycarboxylic acid residue, each of the polyoxyalkylene chains being linked to the remainder of the molecule by a carboxylic ester linkage at each end thereof.

Examples of suitable crosslinkable moieties include isocyanate groups (blocked or unblocked), thiol groups, thiosulphate (Bunte salt) groups or an activated double bond. Thiol groups are preferably attached to respective carboxylic acid residues.

Particularly preferred compounds of the invention are water soluble and contain one or more solubilizing groups such as $-SO_3^-$ or $-NHCO\, SO_3^-$.

In the case of compounds containing thiol groups, water solubility may be achieved by the inclusion in the molecule of one or more $-COO^-M^+$ groups wherein $M^-$ is an alkali metal, ammonia, amine or quaternary ammonium cation.

The invention further includes an aqueous solution of such a water soluble compound.

It should be noted that the term "polycarboxylic acids" as used in the present specification is intended to include dicarboxylic acids as well as acids containing three or more carboxyl groups.

One group of compounds of the invention has the general formula:

$$R-[X-COO-(C_mH_{2m}O)_n-Y]_p \qquad (I)$$

wherein $p$ is greater than 2; R is an organic residue of valency $p$; X may be absent or is an organic carboxylic acid residue; Y is a terminal group containing a moiety capable of cross-linking, $n$ is positive, and $C_mH_{2m}O$ is a straight chain oxy-alkylene group provided that where $n = 1$, $m$ is at least 10, and that where $n$ is greater than 1, $m$ is at least 3. $m$ is preferably 4 or 6 although values of 10 or more may be used. Alkylene groups of polyoxyalkylene chains must be straight-chain in order to give superior light stability. $n$ is preferably greater than about 5, and particularly greater than 9. Polymers with $n$ between 10 and 15 are preferred. Good results are obtained with $n$ as high as about 26 but the polymers are more expensive.

The preferred value of $p$ is 3 and therefore R is preferably a trivalent residue. For example R may be

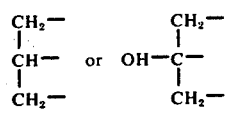

X may be omitted, but if present is preferably $-OOC-(CH_2)_4-$, $-OOC-(CH_2)_2-$, $-OOC-OH_2-$, $-OOC-(CH_2)_8-$, $-OOC-CH=CH-$ or $-OOC-CH_2-C(CH_2)-$.

The crosslinking moiety in the terminal group Y may be, for example, a thiol group, a Bunte salt group, an isocyanate group (blocked or unblocked), or an activated double bond. Y may therefore be such as: $-CO-NH-R-NCO$ where R is, for example, hexamethylene, diphenyl methane or toluylene; $-OC-CH=CH-COOR$ where R is an aliphatic group, $-OC-R-SH$ where R is an alkylene group, preferably methylene; or $-OC-CH_2-SSO_3^-$.

The compounds of the invention may be prepared in a number of ways.

It has been found that difunctional resins are not so effective as polymers of higher functionality. Thus, for example, straight-chain diols may be linked in such a way as to increase the functionality of the molecule. They can undergo both acid and base-catalysed esterification reactions, and the preferred route to a triol is half-esterification with citric acid, a cheap, readily available tribasic acid. This is followed by a second step, in which the crosslinkable groups are introduced, and where this can be achieved by esterification, it can be carried out immediately after the first step, in the same reaction mixture. For capping reactions other than esterification, the intermediate citrate ester may be isolated before proceeding.

Poly(tetramethylene oxide) diols can be made from tetrahydrofuran (T.H.F.) and are available under the trade name 'Polymeg' (Quaker Oats). Such diols have the structure:

$$HO-(CH_2CH_2CH_2CH_2O)_x-H \qquad (II)$$

where $x$, in Polymeg 1000, is 13 or 14.

A polyether glycol in which $m = 6$ may be obtained by polymerising hexane-1,6-diol.

The following is one example of the preparation of a typical isocyanate-terminated polymer:

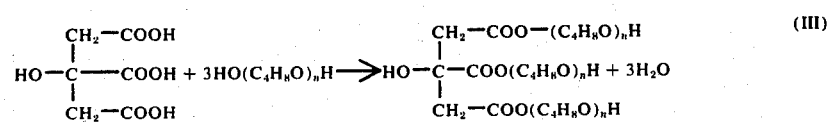

Citric acid    Polymeg 1000 (n=13–14)    3 OCN—(CH$_2$)$_6$—NCO
hexamethylene di-
isocyanate (H.M.D.I.)

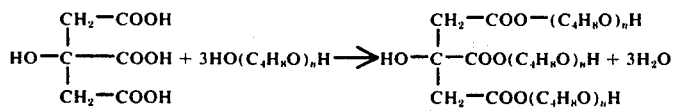

Thiol groups may be introduced, for example, by capping with thioglycollic, as in the following typical reaction sequence:

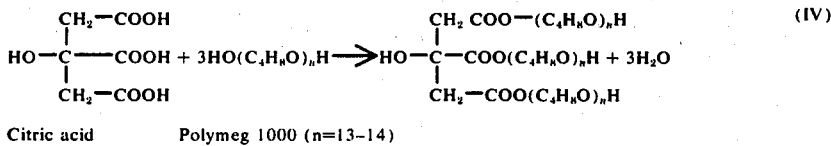

Citric acid    Polymeg 1000 (n=13–14)

3 HOOC—CH$_2$—SH
Thioglycollic acid

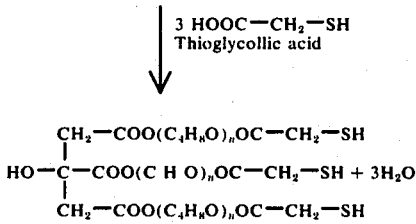

Other mercapto acids than thioglycollic acid may be used, for example thiomalic acid. When a monomer-captodicarboxylic acid such as thiomalic acid is used, the compound is soluble in aqueous alkali, forming a salt.

Similarly, other polybasic aliphatic acids may be used, for example tricarballylic, aconitic, isocitric and hydroxycitric acids, but citric acid is preferred as it is cheap and readily available.

Bunte salt groups may, for example, be introduced by capping with chloroacetic acid followed by treatment with Na$_2$S$_2$O$_3$. The following is a typical reaction sequence:

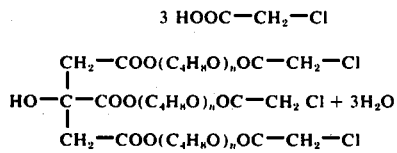

Citric acid    Polymeg 1000 (n=13–14)

3 HOOC—CH$_2$—Cl

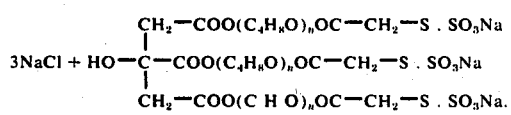

↓ 3 Na$_2$S$_2$O$_3$

3NaCl + HO—C(—COO(C$_4$H$_8$O)$_n$OC—CH$_2$—S . SO$_3$Na)$_3$ structure:

CH$_2$—COO(C$_4$H$_8$O)$_n$OC—CH$_2$—S . SO$_3$Na
|
HO—C—COO(C$_4$H$_8$O)$_n$OC—CH$_2$—S . SO$_3$Na
|
CH$_2$—COO(C H O)$_n$OC—CH$_2$—S . SO$_3$Na.

In these polymers R, in the general formula I, is (IV)

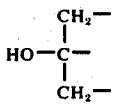

X is omitted, $n$ is 13 or 14, M is 4, $p$ is 3, and Y is —CO—NH—(CH$_2$)$_6$—NCO in the case of formula III, —OC—CH$_2$—SH in the case of formula IV, or —O-C—CH$_2$—SSO$_3$ $^-$Na$^+$ in the case of formula V.

Other methods of increasing the functionality of the diols are available, however, and may be used also. A polyhydric alcohol may be esterified with a single-equivalent excess of a poly-basic, e.g. dibasic, acid to yield the corresponding polybasic ester, which may be subseauently esterified with a diol, followed by attachment of reactive groups.

For example:

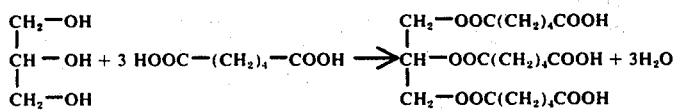

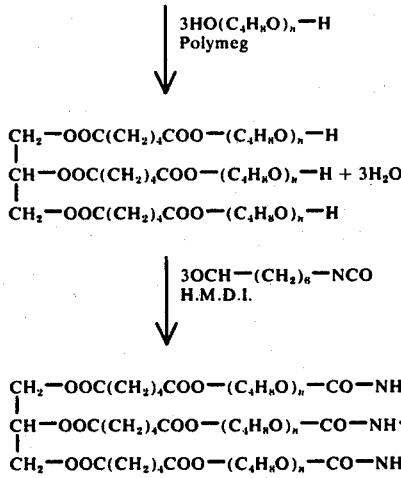

or, in the case of thiol groups:

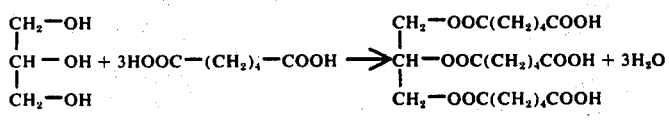

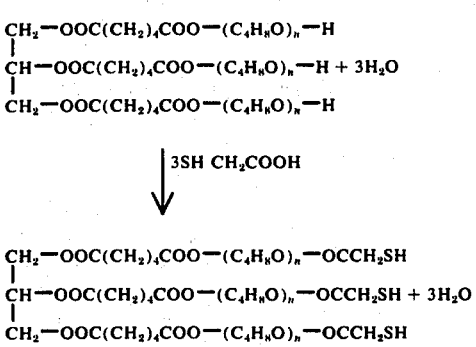

Alternatively the H.M.D.I. may be replaced by 3 moles of monochloroacetic acetic, and the chlorester further reacted with sodium thiosulphate to produce a Bunte salt prepolymer.

Any polyhydroxy compound may be used in this process but the following are particularly successful: glycerol, trimethylolpropane, pentaerythritol, hexane — 1,2,6 — triol, tris (hydroxymethyl) methylamine and triethanolamine. Any polybasic acid may be used but dibasic acids such as malonic, succinic, adipic, sebacic, and itaconic acids are preferred, and sebacic and adipic acids are particularly useful. Tribasic acids, e.g. citric acid, can also be used.

This process may be carried out in one reaction vessel, by successively adding the reagents. Typically, the total time taken for the three reactions is in the order of two hours.

In the polymers of formula VI and VII, again referred to the general formula I, R is

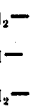

$X$ is $-OOC(CH_2)_4-$; $n$ is 13 or 14; $m$ is 4, $p$ is 3, and $Y$ is $-CO-NH-(CH_2)_6-NCO$ or $-OC-CH_2SH$.

A preferred group of compounds of the invention has the general formula:

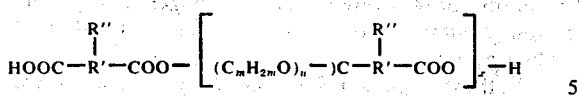

wherein R' is a trivalent organic residue; R" is or contains a reactive group capable of cross-linking; x is at least 1; and n is at least 1, and $C_mH_{2m}O$ is a straight chain oxyalkylene group provided that where $n = 1$, $m$ is at least 10, and that where $n$ is greater than 1, $m$ is at least 3.

R' may be a trivalent alkyl group and is preferably $-C^1H-$. R" is or contains a cross-linkable moiety as discussed above with reference to the group Y, and is preferably $OC-NH-(CH_2)_6-NCO$ or $-SSO_3^-$ or may be $-SH$.

The polymers of formula VIII may be prepared by esterifing a straight-chain diol with a dibasic acid which contains a pendant reactive groupm such as glutamic or malic acid. In this process, the functionality of the product depends upon the ratio of the reactants.

The reaction can be represented as

↓

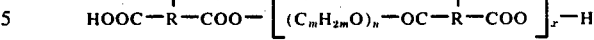

where Z is a reactive group such as $-OH$, $-NH_2$ or $-SH$. The group is then further reacted. For example if glutamic acid is used, Z is $NH_2$:

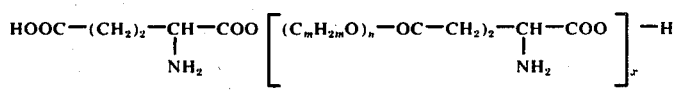

↓ x + 1 moles H.M.D.I.

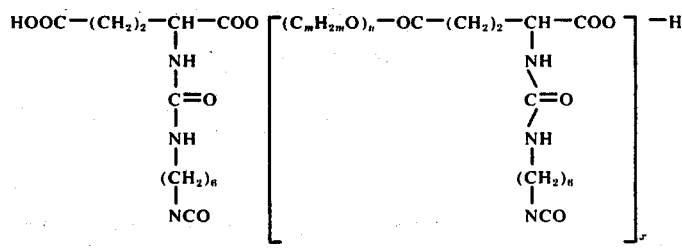

Similarly if, for example, malic acid is used, the pendant $-OH$ group is reacted to introduce the cross-linking reactive group, or if mercapto succinic acid is used the -SH group reacts with, e.g. a di-isocyanate.

In the above reaction scheme the terminal carboxyl groups would also react with the di-isocyanate unless capped, e.g. esterified. As an alternative a one mole excess of the diol may be used. In this latter case a hydroxy terminated polymer results, and if $x$ is 2, the product is trifunctional, if $x$ is 3, tetrafunctional and so on. Preferably $x$ is from 2 to 5.

Another reaction can be represented, by way of example, as:

↓

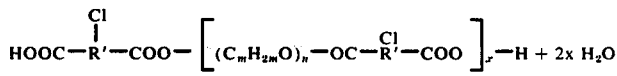

↓ (x + 1)Na₂S₂O₃

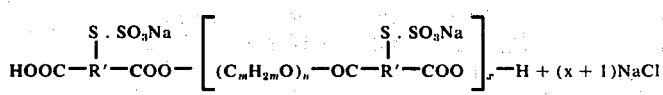

Alternatively hydroxy terminated cross-linkable compounds are obtained if the mole ratio of the first two reactants in the above scheme is reversed.

If desired, products of this type may be further capped on the terminal carboxyl or hydroxy groups.

Where the polymer of Formula VIII is thiol-terminated, it may be prepared by esterifying a straight-chain diol with a dibasic acid which contains a pendant thiol group, such as mercaptosuccinic acid. In this process also, the functionality of the product depends upon the ratio of the reactants.

The reaction can be represented as

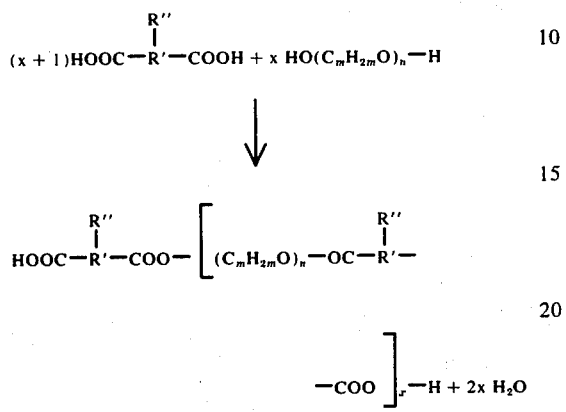

e.g. 4 moles of mercaptosuccinic + 3 moles of Polymeg 1000 yields a tetrafunctional thiol resin of molecular weight about 3400 terminated with COOH groups. Alternatively, hydroxy-terminated polymers may be prepared by reversing the ratio of reactants used. Products of these types may be further capped via their terminal carboxyl or hydroxy groups if desired.

It is particularly prerred to react compounds having terminal carboxyl groups with alkali to produce water-soluble, curable thiol compounds. Thiol-terminated polymers previously available have in general been insoluble in water. As already mentioned, thiol (mercapto) groups may be introduced by, for example, esterification with mercaptocarboxylic acid, such as mercaptopropionic or thioglycollic acid.

Examples of the preferred crosslinkable groups or moieties used in the compounds of the invention and preferred methods for introducing them are as follows:- i. alkene groups: formed, for example as the half-esters of unsaturated dibasic acids or their anhydrides, e.g.

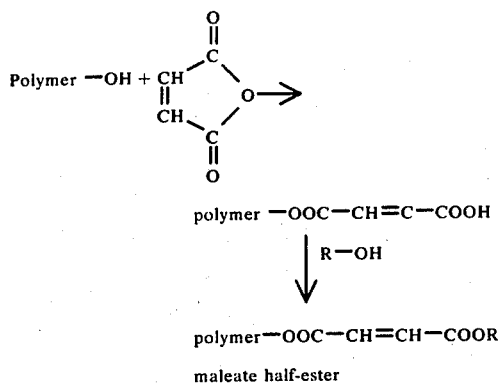

maleate half-ester ii. Isocyanate groups: produced by reaction with a di-isocyanate such as hexamethylene, diphenylmethane or toluene di-isocyanate.

iii. Bisulphite adducts of isocyanates: formed from (ii) above.

iv. Aziridine compounds; formed by the addition of an alkene imine, particularly ethylene imine, to (i) above.

v. Epoxy-terminated isocyanates: formed by the addition of e.g. glycidol to the isocyanates of (ii) above.

vi. Sulphonium derivatives of isocyanates: formed, for example, as follows:-

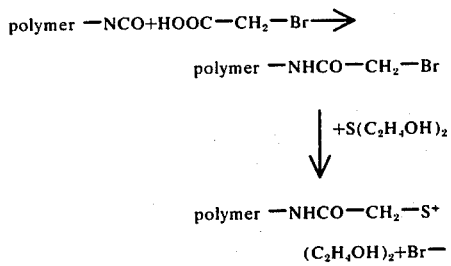

vii. Bunte salt groups which may be introduced by reaction of halogen-terminated compounds with Na$_2$S$_2$O$_3$ or by treatment of the corresponding thiol-terminated compounds with sodium bisulphite and sodium tetrathionate (Na$_2$S$_4$O$_6$).

viii. Thiol groups, which may be introduced by reaction with a thiol-containing carboxylic acid.

As is well understood in the art the term "blocked isocyanates" is used herein to denote isocyanate-terminated compounds in which the isocyanate groups have been reacted with a substrate which forms a semistable compound therewith or where the blocking group is itself reactive. The blocking reaction in the first case is reversible under mild conditions, releasing the original isocyanate terminal compound, the isocyanate groups of which are now free to cross link in the presence of, for example, water. Examples of blocking groups are phenols, amines and other compounds containing active hydrogen atoms. Although examples of preferred blocking reaction have been given above these are by no means exhaustive and any blocking reaction may be used.

All the compounds of the invention may be applied to textiles, and more particularly keratinous fibres such as sheep's wool, and cross-linked on the fibre to give shrink-resistant and permanent press effects. The cross-linked resins show high light stability and do not develop offensive smells on exposure to light.

All the compounds of the invention exhibit superior light fastness, when used in textile applications, than comparable resins previously available. While the usefulness of the invention in no way depends on the correctness or otherwise of the supposition, we believe that using, in polymers polyoxyalkylene chains which have side branches, e.g.

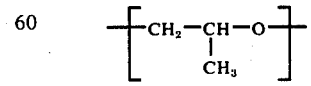

renders such polymers more liable to degradation owing to splitting of the branched oxyalkylene chain by light energy. Such degradation leads to a lessening of the shrink-resist or permanent press effect, and may in the case of thiol resins give rise to unpleasant smells.

The unbranched polyoxyalkylene chains used in all the compounds of the present invention are, we have found, far more stable to light when cured and are therefore more suitable for use in textile finishing operations where the textiles, e.g. garments, are subsequently going to be exposed to light.

As mentioned above previously available curable thiol prepolymers have been insoluble in water at pH values low enough not to affect a keratinous substrate. Thus they had to be applied to textiles from solvent, which is costly as it requires recycling of the solvent and expensive machinery, or from aqueous emulsions. Application from aqueous emulsions can suffer from the defect of inadequate spreading of the polymer on the fibre surface. Where catalysts are used, these are generally dissolved in the aqueous phase and can cause inadequate curing of the interior of the droplets of emulsified resin leading to the deposition of 'capsules' of uncured resin rather than the even, fully cured film required in textile finishing. The preferred water-soluble thiol compounds of the invention are free from these defects.

The thiol compounds of the invention exhibit superior light fastness, when used in textile applications, than thiol resins previously available.

The invention further includes a process for finishing keratinous fibres which comprises treating the fibres with a compound according to the invention and curing the compound, or allowing it to cure, on the fibres.

The invention also includes a process for the simultaneous dyeing and shrink-resist treatment of keratin fibres which comprises impregnating the fibres at a pH of 2 – 10, preferably e.g. 3 – 6, and at a temperature of 10° – 60° C. with an aqueous composition comprising
a. a water-soluble dye containing anionic solubilising groups;
b. a water-soluble or emulsifiable cross-linkable compound according to the invention;
c. at least 25 grams per liter of a compound of the general formula IX

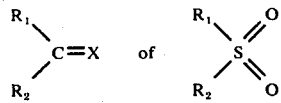

wherein $R_1$ and $R_2$ which may be the same or different each represents a primary, secondary or tertiary amino group which may contain further substituents e.g. hydroxyl groups, and X represents an oxygen atom, a sulphur atom or $a$ = NH group; storing the treated fibres for a period of e.g. 10 minutes to 72 hours to fix the bulk of the dye on to the fibres, and subsequently curing the cross-linkable compound.

Isocyanate compounds according to the invention for use in this simultaneous dyeing and deposition procedure should be blocked or at least slow reacting with water and should be soluble (e.g. the bisulphite adduct) or emulsifiable (e.g. the imine adduct).

Bunte salt compounds of the invention are water-soluble and fully compatible with dyeing. Thiol polymers of this invention can be used provided care is taken to select a dye that does not react with the thiol groups of the polymer.

The dye and the cross-linkable compound are preferably applied to the fibres by means of a pad mangle. The viscosity of the liquor is preferably adjusted to a value in the range of 5 – 20 poise measured at a low rate of shear. (Pad liquors normally employed exhibit non-Newtonian viscosity characteristics and the measured viscosity characteristics depend on the applied shear forces). The viscosity should be below 20 poise so that the liquor is sufficiently fluid and should be above 5 poise to prevent gross migration of the liquor through the stored dyed material and to prevent pressure marking and stitch marking which are faults which can become apparent during storage. The liquor can be adjusted to the required value using a thickener and concentrations in the range 10–30 g/l are normally suitable. Thickeners which can be employed are based, for example, on carboxymethyl cellulose, locust bean gum, Guar gum and the like. The preferred thickener, which imparts thixotropic properties to the pad liquor, is that sold under the trade name Guaranate AP5.

The keratin fibres to be treated will normally be the wool of sheep, but may if desired be derived from alpaca, cashmere, mohair, vicuna, guanaco, camel hair or llama or blends of these materials with sheep's wool. The fibrous materials may consist wholly of wool or be a blend of wool with synthetic fibrous and filamentary material or with natural or regenerated cellulosic fibres. In general, however, the material should contain at least 30% wool and the invention is especially appropriate to the treatment of 100% wool-containing material. The wool may be treated at any stage during textile processing and may be in the form of tops, card sliver, noils, yarns, threads, woven or knitted fabrics, non-woven fabrics, pile fabrics or made-up garments.

The dyes which can be employed in the present process are water soluble and contain anionic solubilising groups. Thus acid levelling, acid milling, premetallised and solubilised vat dyes can be used but especially good results can be obtained with fibre-reactive dyes, i.e. dyes wich can react with the keratin fibres and become chemically bonded thereto.

The acid levelling dyestuffs can be, for example, of the azo type and should be water soluble and contain at least one anionic solubilising group, generally a sulphonic acid group. Acid milling dyes generally have a greater molecular weight and fewer solubilising groups than the acid levelling dyes, but there is no rigid distinction between the two classes. The premetallised dyes comprise a class of dyes having o,o - dihydroxy azo, o-amino- o-hydroxy azo or o-carboxyl- o-hydroxy azo groups which are co-ordinated to a metal atom, for example chromium or cobalt. The dyes may be used as 1:1 or 2:1 complexes. Vat dyes, which are most commonly of the indigoid or anthraquinone structure, are solubilised by conversion to their water-soluble leuco esters and can subsequently be developed after application, by oxidation to the insoluble form.

The reactive dyes, which are of especial interest, can include the following groups: epoxy-, ethyleneimino-, isocyanate-, isothiocyanate-, carbamic acid aryl ester-, propiolic acid amido-, monochloro-, and dichloro-crotonylamino-chloroacrylamino-, acrylamino, sulphohalo-, sulphuric acid ester, sulphoxy, labile halogen atoms, trichloropyridazino-, dichloroquinoxalino-, allylsulphonyl-, thiosulphate, and certain reactive ammonium of hydroxonium residues, monochlorodifluoropyrimidine, carboxymethylcarbodithionate.

Especially good results are obtainable with highly reactive dyes, for example those incorporating a 2,4-dichlorotriazinyl-, monochlorodifluoropyrimidine, vinylsulphonyl-, 2,3-dichloroquinoxalino-, or bromoacrylamido group. In the case of less reactive halogen-containing dyes, they may be rendered more reactive by applying them in admixture with a tertiary amine, for example triethylamine. The term "reactivedye" as used herein also includes whitening agents which react with the fibre in the same way.

The additives of general formula IX are normally present in concentrations of 25-300 grams per liter. Urea, thiourea and sulphamide may be employed.

Reducing agents for the keratin can be incorporated into the aqueous conposition used in the present process and are generally compounds capable of breaking the disulphide bonds in the keratin. They include alkali metal, ammonium and amine sulphites and bisulphites, for example, sodium bisulphite, sodium meta-bisulphite, and monoethanolamine sesquisulphite, certain quaternary phosphonium compounds, for example, tetrakis-(hydroxymethyl)-phosphonium chloride, sodium borohydride, and thioglycollic acid and other such materials, usually ones capable of breaking disulphide bonds in the keratin molecule but having no action on the dye. The incorporation of such reducing agents may be desirable in the case of fabrics where the dyeing is liable to be skittery or unlevel. The amount of reducing agent per 100 parts by weight of liquor may, for example, be from 1 to 50, preferably from 1 to 20 parts by weight. The use of sodium bisulphite, which is preferred, has the advantage that it exerts a bleaching action on the wool and therefore allows very bright shades to be obtained. However, not all reducing agents are equally effective with a particular dye, and the particular reducing agents or agents to be used with a given dye to obtain the optimum results should be ascertained by routine trial. The water-soluble crosslinkable compounds according to the invention often exhibit surface active properties. Further surfactant can if desired be added to the liquor and suitable surfactants include non-ionic condensation products of nonylphenols with ethylene oxide, e.g. polyoxyethylated nonyl phenols containing 10-30 mols of ethylene oxide and anionic sulpho-succinate derivatives. A suitable non-ionic surfactant is, for example, sold under the Trade Mark Lissapol N. If desired non-ionic acid amide-derived surfactants may be used, for example a condensation product of coconut oil fatty acids with diethanolamine such as that available under the trade name Atexal PN-VP.

After application of the composition of the textile fibres they are preferably rolled or folded up, covered with an impervious material to maintain humidity, and stored in this condition, e.g. at room temperature, during the period whilst the dye is penetrating the keratinous fibres, i.e. for a period of about 1 to 48 hours, generally about 24 hours. The impervious sheet material may be a film of hydrophobic material, e.g. a film of hydrophobic plastics material such as polyethylene. Polyvinyl acetate film or printers paper may also be employed. After the storage period the goods are washed to remove excess or unfixed dye.

After storage the fibres are treated with an aqueous solution of an acid, base, oxidizing agent or heavy metal salt to effect curing of the polymer. Then the fibres are subjected to a washing treatment. When using acid levelling, acid milling or premetallized dyes, washing in water for about 15 minutes will be sufficient to remove unfixed dye. When using a vat dye leuco ester, an acid oxidizing after-wash is required to convert the dye into its fully oxidized form, for example a 10 minute wash with a 2 g/l ammonium persulphate solution brought to pH 2 with a sulfuric acid. When using reactive dyes, washing off is preferably carried out using an aqueous solution of a reducing agent or base. Various bases can be used, for example, alkali metal or ammonium hydroxides, salts strong bases and weak acids, for example, sodium bicarbonate, or water-soluble aliphatic amines, for example dimethylamine. The reducing agents or bases are employed in the form of aqueous solutions which contain preferably 0.1 to 2.0% by weight of the dissolved material based on the weight of the solution.

Ammonia is the preferred agent to use in the after-treatment step. This treatment with a solution of a reducing agent or base may be, for example, for a period of 15 minutes at a temperature from ambient temperature to 100° C. generally about 60° C.

The invention will be better understood by reference to the following examples which are given for the purpose of illustration only. Levels of compounds applied to fabrics are given as % of weight of fabric (o.w.f.) unless otherwise indicated. The tests referred to in the Examples were conducted as follows:

Machine washability

Flat samples and simulated trouser cuff samples were machine washed in 0.1 M pH 7 phosphate buffer at 40° C (1 kg load in 22 liters in a Bendix MRE washing machine except where otherwise indicated). All the samples were spin-dried, the flat samples were then hang-dried and the cuff samples were tumbled-dried (30 min.)

Fabrics employed included doctor flannel - plain weave woollen fabric 185 g/m$^2$, and worsted serge of 13/14 oz per running yard (270 g/m$^2$).

Felting shrinkage was determined after washing by measurement of previously applied bench-marks. The smooth-drying index was measured by comparing the washed samples with AATCC Durable Press standards in low incidence angle lighting. The ratings range from 1 (bad) to 5 (perfect). The differential cuff edge shrinkage was determined by calculating the difference between the mean shrinkage of the two cuff edges and the shrinkage across the centre of the cuff sample after each wash cycle. Allowance was made for relaxation shrinkage after a 10 min. wash cycle.

Stability to light 14 cm × 4.5 cm samples of treated doctor flannel were exposed to artificial sunlight (Xenon arc) in a Xenotest Fadeometer to standard 5, 6 or 7 on the blue scale. These were then washed, along with unexposed pieces (1 kg load), in 15 liters of pH 7 buffer in a Cubex washing machine and the shrinkage assessed after 1, 2 and 3 hours washing. The results are expressed as the difference in shrinkage between the exposed and the unexposed samples.

EXAMPLE 1

Preparation of Polymer I

A mixture of 250 grams (0.2487 mole) Polymeg 1000, 17.5 grams (0.0833 mole) citric acid monohydrate, 10 grams toluene-p-sulphonic acid monohydrate, and 50 ml benzene were refluxed under nitrogen with stirring until the theoretical 6.95 ml water hand collected in the Dean and Stark trap. This was accomplished in 2 hours. After cooling the reaction mixture slightly, 24.1 grams (2% excess over theory) 99% chloroacetic acid was added, and in less than an hour's refluxing the predicted 4.6 ml of water had distilled over.

The reaction mixture was cooled, washed several times with water to remove excess acid, dried with magnesium sulphate, and then solvent and other low molecular weight impurities removed under reduced pressure. The yield of pale straw-coloured polymer was 269 grams (95% of theory).

Preparation of Polymer II

In a reaction vessel fitted with a stirrer, reflux condenser, and nitrogen inlet, was placed a mixture (at pH 5) of
- 30 grams Polymer I (0.0265 g. equiv.)
- 13 grams $Na_2S_2O_3.5H_2O$ (0.0524 g. equiv.)
- 50 ml dimethylformamide (D.M.F.)
- 20 ml water.

The mixture was heated at 100° C for 1 hour and then at 110° C for ½ an hour, after which it was allowed to cool at room temperature. A 1 ml aliquot of the mixture dissolved completely in 50 ml of water.

The reaction mixture was diluted with water, made 2% with respect to sodium sulphite, padded onto wool fabric, dried at 100° C for 15 minutes, given a brief wash off and dried again at 100° C for 5 minutes. The finished fabric was then tested for machine washability as described and the area shrinkage results are shown in Table 1 and the differential shrinkage due to exposure to light in Table 2.

TABLE 1

| | Polymer II on doctor flannel and serge | | | |
|---|---|---|---|---|
| Polymer Level | % Area Shrinkage (doctor flannel) | | Smooth Drying Index (serge) | |
| | 1 hr. wash | 3 hr. wash | 1 hr. wash | 3 hr. wash |
| 1 % | 0 | 12 | 3 | 2 |
| 2 % | 0 | 3 | 3.5 | 3 |
| 3 % | 0 | 3 | 3.5 | 3.5 |
| 4 % | 0 | 1 | 3.5 | 3.5 |
| Untreated | 53 | 68 | 1 | 1 |

TABLE 2

| Polymer II on doctor flannel Differential Warp Shrinkage (%), 3% polymer | | | |
|---|---|---|---|
| 1 hr. wash | | 3 hr. wash | |
| exposed to Standard 6 | exposed to Standard 7 | exposed to Standard 6 | exposed to Standard 7 |
| 1 | 2 | 1 | 5 |

EXAMPLE 2

A mixture of 100 grams hexane-1,6-diol, 0.4 gram $H_2SO_4$ and 0.4 gram boron trifluoride etherate was heated under a gentle stream of nitrogen for 2 hours, the water of reaction and the small amount of oxepane formed distilling off. The syrupy residue in the reaction vessel was washed with water and dried with $MgSO_4$, and was found to have a hydroxyl number of 92.7 corresponding to a polyether glycol of molecular weight 1210. The yield was 70%.

Some of this glycol was reacted with citric acid in 3:1 molar ratio followed by esterification with chloroacetic acid and then replacement of the chlorine atom with $-SSO_3$ groups, as in Example 1.

This prepolymer, (Polymer III) when applied to wool fabrics and cured as in Example 1 conferred excellent shrink resistant properties. The cured resin had a light fastness better than standard 6.

EXAMPLE 3

Wool fabrics were impregnated on a pad mangle with the following composition:
- Sodium bisulphite 30 g/l
- Urea 300 g/l
- Atexal PN-VP 5 g/l
- Guaranate AP5 6g/l
- Acetic acid 1 g/l
- Procion Red MG 10 g/l
- Polymer II to give 3% o.w.f.

The impregnated material was wound onto a former, covered with a polyethylene sheet and stored for 24 hours.

The material was then washed with 1% aqueous ammonia at a liquor ratio of 15:1 for 15 minutes and dried for 15 minutes at 60 to 70° C.

Samples of the treated material were tested for felting shrinkage by washing in 15 litres pH 7 buffer (in an INTERNATIONAL CUBEX washing machine). The shrink results obtained were similar to those of previous examples and the material was dyed an even fast red shade.

EXAMPLE 4

Preparation of Polymer IV 299 grams (0.296 mole) Polymeg 1000 (mol. wt.1010), 20.7 grams (0.0987 mole) citric acid monohydrate, 100 ml toluene and 10 grams toluene-p-sulphonic acid monohydrate were refluxed with stirring under nitrogen, allowing water of hydration and reaction to collect in a Dean and Stark receiver. After 1½ hours, the predicted 8.1 ml water had collected, and the reaction mixture was cooled, and washed several times with water to remove acidic impurities.

This solution was dried with $MgSO_4$, and then concentrated under reduced pressure, to yield 301g colourless polymer, which is 98% of theoretical yield.

Preparation of Polymer V 25 grams (0.1252 mole + 20% excess) H.M.D.I. and 250 ml A. R. toluene were stirred under nitrogen in a vessel equipped with a reflux condenser and dropping funnel. From the latter, 100 grams (0.0313 mole) of Polymer IV dissolved in 100 ml A.R. toluene was added slowly over a period of 15 minutes, and then the temperature of the mixture was gradually raised to reflux over another 15 minutes. After an hour at this temperature (approximately 116° C), the mixture was allowed to cool, and excess H.M.D.I. and solvent were removed under reduced pressure.

Solutions of Polymer V in perchloroethylene were prepared, and padded on to wool fabrics which were subsequently tumble-dried. The dry fabric was subdivided and the pieces cured and washed as indicated in Tables 3 and 4.

Full-decatising (high temperature steam flat-setting was carried out between cottom wrappers in a vacuum autoclave using 15 lb/in² gauge steam pressure for 5 min.

TABLE 3

| Curing Conditions | Polymer Level | Polymer V on wool fabric % Area Shrinkage (Doctor flannel) | | Smooth drying index (Serge) | |
|---|---|---|---|---|---|
| | | 1 hr. Wash | 2 hr. Wash | 1 hr. Wash | 2 hr. Wash |
| 5 min full decatise | 3% | 0 | 0 | 3.5 | 3.5 |
| " | 2% | 0 | 2 | 3.5 | 3-3.5 |
| " | 1% | 0 | 3 | 3 | 3 |
| Untreated | Nil | 53 | 65 | 1 | 1 |
| Room temp. 2 days | 3% | 0 | 1 | 2-3 | 2-3 |

TABLE 4

| Curing Conditions | Polymer Level | Differential warp shrinkage (%) (Doctor flannel) after exposure to artificial sunlight. 1 hr. wash | Standard 6 3 hr. wash |
|---|---|---|---|
| 5 min full decatise | 2% | 1 | 2 |
| " | 3% | 0 | 0 |
| " | 4% | 0 | 0 |

EXAMPLE 5 (Polymer VI)

The bromo analogue of Polymer I was prepared employing the conditions of Example 1 but substituting bromoacetic acid for chloroacetic acid. The thiosulphato derivative was prepared by reacting the bromo analogue with sodium thiosulphate, according to the method described in Example 1 except that isopropanol is used as a solvent in place of DMF. Its application to wool fabric was identical to that described for Polymer II. The test results are shown in Table 5.

TABLE 5

| Polymer level (o.w.f.) | Polymer VI on wool fabric Area shrinkage (%) | |
|---|---|---|
| | 1 hr. wash | 3 hr. wash |
| 1% | 3 | 17 |
| 2% | 0 | 1 |
| 3% | 0 | 0 |
| NIL | 53 | 65 |

EXAMPLE 6 (Polymer VII)

20 grams Polymer V were dissolved in 100 grams 2-ethoxyethanol. To this solution was added 2.9 grams 90% $Na_2S_2O_5$ in 20 ml water with vigorous stirring, and the mixture was stirred for 4 hours. A sample of this solution concentrated in vacuo showed no trace of free isocyanate by infrared analysis.

The mixture was diluted further with water, and padded on to wool fabric. After drying at 80° C. the fabric was fully decatized for 5 minutes to cure the polymer. The results of wash tests (carried out as in Example 1) are shown in Tables 6 and 17.

TABLE 6

| Polymer Level | Polymer VII on woollen doctor flannel | | Warp shrinkage (%) after exposure to artificial sunlight (Standard 6) | |
|---|---|---|---|---|
| | % Area shrinkage | | | |
| | 1 hr wash | 2 hr wash | 1 hr wash | 3 hr wash |
| 1% | 2 | 10 | | |
| 2% | 0 | 5 | 1 | 3 |
| 3% | 0 | 4 | | |
| 4% | | | 2 | 4 |
| Untreated | 53 | 65 | | |

EXAMPLE 7 (Polymer VIII)

10 grams (0.0026 mole) of the citric acid half ester of hexan-1,6-diol as prepared in Example 2 was reacted with 1.6 grams (0.0095 mole) of H.M.D.I. M.D. I. by the method described in Example 4 for Polymer V. The polymer was applied to woollen doctor flannel from perchloroethylene and the treated fabric dried and fully decatised. The test results are shown in Tables 7 and 17.

TABLE 7

| Polymer VIII on doctor flannel | Area shrinkage % |
|---|---|
| Polymer level | 1 hr wash |
| 1% | 0 |
| 2% | 0 |
| 3% | 0 |

EXAMPLE 8 (Polymer IX)

25 grams (0.02027 g. equivalents) Polymer VI were dissolved in 30 ml toluene, and added to this were 1.5 grams (0.02027 mole) glycidol, 1 drop of dibutyltin dilaurate and 50 mg. triethylenediamine. The mixture was held for 2 hours at room temperature, after which time an infra-red spectrum of the product showed no peak at 2265 mm, indicating that all isocyanate groups were blocked.

The mixture was diluted with perchloroethylene, padded on to woollen doctor flannel and serve and then cured. The samples were then machine washed (as in Example 4) with or without exposure to light. The test results are given in Table 8.

TABLE 8

| Curing Conditions | Polymer Level | % Area Shrinkage (Doctor flannel) | | Smooth drying index (serge) | |
|---|---|---|---|---|---|
| | | 1 hr wash | 2 hr wash | 1 hr wash | 2 hr wash |
| 100°/15 minutes dry, then autoclave 5 mins at 15 p.s.i. | 3% | 0 | 3 | 3.5 | 3 |
| | 3% | 0 | 4 | 3.5 | 3 |
| " | 2% | 2 | 10 | 3 | 2-3 |
| " | 1% | 5 | 16 | — | 2 |
| Untreated | Nil | 53 | 65 | 1 | 1 |

EXAMPLE 9 (Polymer X)

0.90 grams (0.02027 mole + 3% excess) ethylene imine in 10 ml toluene was added slowly with stirring to 25 grams (0.02027 g. equivalent) of Polymer VI dissolved in 50 ml toluene. After half an hour there was no trace of free isocyanate in the mixture (ascertained by infra-red analysis).

The solution was diluted with perchloroethylene and padded onto woollen doctor flannel, It was then dried, cured by authclaving for 5 mins. at 15 p.s.i., and washed.

The test results are shown in Tables 9 and 17.

TABLE 9

| | | Polymer X on Wool fabric | | | |
|---|---|---|---|---|---|
| | | % Area Shrinkage | | Smooth drying index | |
| Curing Conditions | Polymer Level | 1 hr wash | 2 hr wash | 1 hr wash | 2 hr wash |
| Dry, then authclave 5 mins at 15 p.s.i. | 3% | 0 | 0 | 3.5 | 3 |
| " | 2% | 1 | 2 | 3–3.5 | 3 |
| " | 1% | 1 | 5 | 3 | 2–3 |
| Untreated | Nil | 53 | 65 | 1 | 1 |

EXAMPLE 10

Preparation of Polymer XI

A mixture of 21.9 grams (0.149 mole) glutamic acid, 200 grams Polymeg 1005 (0.199 mole), 5 grams toluene-p-sulphonic acid monohydrate and 50 g. toluene was refluxed under nitrogen with stirring until 5.84 ml water had been collected in a Dean and Stark trap. The mixture was allowed to cool, and was then washed several times with water, dried with $MgSO_4$, and concentrated in vacuo to yield 205 grams of a pale straw coloured polymer.

Preparation of Polymer XII

This pale yellow polymer was prepared in the same manner as Polymer VI, the reaction mixture comprising:

7.0 grams (0.0345 mole + 20% excess) H.M.D.I.
30 grams (0.0345 g. equivalents) Polymer XI
200 grams toluene Some of the polymer was dissolved in perthloroethylene and padded onto woollen doctor flannel. This was dried, cured (as indicated in the Table) and machine washed (see Example 4) and the test results are shown in Table 10.

TABLE 10

| | Polymer XII on woollen doctor flannel and serge | | |
|---|---|---|---|
| Curing Conditions | Polymer Level | Area Shrinkage after 1 hr wash | Smooth drying index after 1 hr wash |
| 5 mins steam | 3% | 0 | 2–3 |
| 5 mins autoclave | 3% | 0 | 3 |
| 5 mins autoclave | 2% | 0 | 3 |
| 5 mins autoclave | 1% | 1 | 2–3 |
| Untreated | Nil | 53 | 1 |

Example 11 (Polymer XIII)

The bisulphite-adduct of Polymer XII was prepared by the method described in Example 10. The resulting pale polymer was padded onto woollen doctor flannel from aqueous solution, dried at 80° for 10 minutes, cured by autoclaving for 5 minutes, and given a machine wash (see Example 4).

The test results are given in Table 11.

TABLE 11

| | Polymer XIII on woollen doctor flannel | |
|---|---|---|
| Polymer level | % Area Shrinkage 1 hr wash | Smooth drying index 1 hr wash |
| 1% | 3 | 2–3 |

TABLE 11-continued

| | Polymer XIII on woollen doctor flannel | |
|---|---|---|
| Polymer level | % Area Shrinkage 1 hr wash | Smooth drying index 1 hr wash |
| 2% | 0 | 3 |
| 3% | 0 | 3.5 |
| Nil | 53 | 1 |

Example 12 (Polymer XIV)

The method of Example 8 was followed to prepare the glycidol-blocked version of Polymer XII, using:

5 grams Polymer XII (0.00654 g. equivalents)
0.50 grams glycidol (0.00645 mole + 5% excess)
50 ml toluene
1 drop dibutyltin dilaurate
50 mg triethylenediamine The methods of application and test were the same as those for Example 8. Test results are given in Table 12.

TABLE 12

| | Polymer XIV on wool fabric | | |
|---|---|---|---|
| Curing Conditions | Polymer Level | % Area Shrinkage 1 hr wash | Smooth Drying Index 1 hr wash |
| Dry 100°/5 mins cure 5 mins steam at 15 p.s.i. | 3% | 1 | 3 |
| as above | 2% | 3 | 2–3 |
| as above | 1% | 6 | 2 |
| untreated | Nil | 53 | 1 |

Example 13 (Polymer XV)

The method of Example 9 was followed to prepare the aziridine-terminated version of Polymer XII, using:

5 grams Polymer XII (0.00645 g. equivalents)
0.27 grams ethyleneimine (0.00645 mole + 3% excess)
50 ml toluene An infra-red spectrum of the product showed no trace of isocyanate.

The polymer was applied from solvent, and cured by drying and steaming (5 mins). The test results are shown in Table 13.

TABLE 13

| | Polymer XV on woollen doctor flannel | |
|---|---|---|
| | % Area Shrinkage | |
| Polymer Level | 1 hr wash | 2 hr wash |
| 1% | 2 | 6 |
| 2% | 2 | 3 |
| 3% | 0 | 0 |
| Untreated | 53 | 65 |

Example 14 (Polymer XVI)

Preparation of poly (hexamethylene oxide)

A mixture of 100 grams hexane-1,6-diol, 0.4 grams sulphuric acid and 0.4 grams boron trifluoride etherate was heated under a gentle stream of nitrogen for 2 hours, the water of reaction and the small amount of oxetane formed distilling off. Because the water and oxetane are slightly miscible, their collection and measurement is only a rough guide to the extent of reaction. The syrupy residue in the reaction vessel was washed with water and dried with $MgSO_4$, and was found to have a hydroxyl number of 92.7, corresponding to a polyether glycol of molecular weight 1210. The yield was 70% of theory.

Preparation of Polymer XVI

This poly(hexamethylene oxide) was then esterified with citric acid, in the manner previously described (see Example 4), and subsequently capped with hexamethylene diisocyanate as for Polymer V.

The polymer was applied to woollen doctor flannel from perchloroethylene and the treated fabric dried and fully decatised. The test results are shown in Table 14.

TABLE 14

Polymer XVI on doctor flannel

| Polymer level | Area Shrinkage (%) | Differential warp shrinkage (%) after light exposure to standard 6 | |
|---|---|---|---|
| | | 1 hr wash | 3 hr wash |
| 1% | 0 | — | — |
| 2% | 0 | 0 | 0 |
| 3% | 0 | 1 | 1 |
| 6% | — | 0 | 0 |

EXAMPLE 15

Wool fabrics were impregnated on a pad mangle with the following composition per liter:

| | |
|---|---|
| Urea | 300 g |
| Atexal PN- VP; | 10 g |
| Guaranate AP5; | 6 g |
| Acetic Acid; | 1 g |
| Triethanolamine; | 10 g |
| Procion Red MG; | 10 g |
| Polymer XIII; | to give 3% o.w.f. |

The impregnated material was wound onto a former, covered with a polyethylene sheet and stored for 24 hours. Then either a 1% sulphuric acid, hydrogen peroxide or sodium carbonate solution, preferably containing a heavy metal salt, was padded on to the wet stored fabric and allowed to remain for 15 minutes to effect curing of the polymer or, alternatively, the fabric was placed in a bath of the acid, oxidising agent or base for 15 minutes. The material was then washed with 1% aqueous ammonia at a liquor ratio of 15:1 for 15 minutes and dried for 15 minutes at 60°–70° C.

Samples of the treated material were tested for felting shrinkage on washing in 15 liters pH7 buffer (CUBEX washing machine). The shrinkage results obtained were similar to those of previous examples and the material was dyed an even fast red shade.

The cross-linkable compound used in this Example can be replaced by other water-soluble or emulsifiable compounds of the invention and satisfactory results obtained. Other dyes can be substituted for Procion Red MG.

EXAMPLE 16

Comparative example of branched oxyalkylene chain polymer (Polymer XVII)

100 grams (0.1 mole) of a poly(propylene oxide)triol of molecular weight 3000, 18 grams (0.1 mole + excess) of H.M.D.I. and 300 grams of toluene were refluxed with stirring under nitrogen. After two hours the mixture was cooled, and solvent and excess H.M.D.I. were removed under reduced pressure. Solutions of the polymer in perchloroethylene were padded onto wool fabric, which was subsequently tumble-dried and left at room temperature overnight.

The cure of the polymer on the fabric was finally completed by treatment with steam at 15 p.s.i. for 5 minutes. The wash test results are given in Table 15 and the lightfastness results in Table 17. From table 17 it can be seen that the lightfastness of this polymer is inferior to those of the invention.

TABLE 15

Polymer XVII on wool fabric.

| Polymer Level | Area Shrinkage | |
|---|---|---|
| | 1 hr wash | 3 hr wash |
| 1% | 2 | 8 |
| 2% | 0 | 3 |
| 3% | 0 | 0 |
| Nil | 53 | 65 |

EXAMPLE 17

Another comparative example with branched oxyalkylene chain (Polymer XVIII)

This is the carbamoyl sulphonate derivative formed by the reaction of Polymer XVII with sodium bisulphite, according to the general method outlined in Example 6. The polymer was padded ontowool fabric from aqueous solution and cured by drying at 120° C for 5 minutes followed by flat-setting of the fabric in an autoclave at 15 p.s.i. for 5 minutes. The results of wash tests are shown in Table 16 and those of lightfastness testing in Table 17. Again, the lightfastness does not compare favourably with the polymers of the invention.

TABLE 16

Polymer XVIII on wool fabric

| Polymer Level | Area Shrinkage % | |
|---|---|---|
| | 1 hr wash | 3 hr wash |
| 1% | 4 | 12 |
| 2% | 1 | 2 |
| 3% | 0 | 0 |
| Nil | 53 | 65 |

TABLE 17

Lightfastness of Various Polymers on wool fabric

Differential Warp shrinkage % (doctor flannel) after exposure to light

| Polymer (3% o.w.f.) | Standard 5 | | Standard 6 | |
|---|---|---|---|---|
| | 1hr wash | 3hr wash | 1hr wash | 3hr wash |
| VII | 1 | 1 | 1 | 3 |
| VIII | 0 | 0 | 0 | 1 |
| X | 0 | 0 | 0 | 0 |
| XVII | 2 | 12 | 6 | 17 |
| XVIII | 4 | 15 | 8 | 18 |

EXAMPLE 18

Polymer XIX 100 grams of Polymeg 1000 was esterified with 7 grams of citric acid, and the product of this reaction was further esterified with bromoacetic acid, to give a tris(bromacetato) polymer. The procedure for this synthesis was similar to that described in Example 1.

After being washed free of acid catalyst, 78.8 grams of the above polymer were dissolved in 150 mls of acetone, and 3.4 mls of ethyleneimine and 4 grams of anhydrous sodium carbonate were added with stirring.

The mixture was refluxed for 15 minutes, then cooled and concentrated under reduced pressure.

The polymer was applied to wool fabric by padding from solution in 50% aqueous isopropanol, the solution also containing 2% sodium metabisulphite. The fabric was dried at 120° C for 10 minutes, then rinsed to remove salts.

Polymer XX

This was a repeat of the preparation of Polymer XIX, using triethylamine (14 grams) in place of the sodium carbonate.

The results of the wash tests are given in Table 18.

TABLE 18

Polymers XIX and XX on wool fabric

| Polymer and level | Area shrinkage (%) | |
|---|---|---|
|  | 1 hr wash | 3 hr wash |
| Polymer XIX |  |  |
| 2% | 0 | 0 |
| 3% | 0 | 0 |
| Polymer XX |  |  |
| 2% | 0 | 0 |
| 3% | 0 | 0 |

EXAMPLE 19 (Polymer XXI)

A mixture of 100 grams (0.0995 mole) of Polymeg 1000, 19.9 grams (0.133 mole) of 2-mercaptosuccinic acid, 50 mls of toluene, and 2 grams of toluene-4-sulphonic acid monohydrate was refluxed with stirring under nitrogen, with water of reaction and hydration being removed by azeotropic distillation. After 1 hour, the predicted volume of water had accumulated in a Dean and Stark receiver, and no more was observed to distil over during the next 30 minutes. The reaction mixture was cooled, further diluted with toluene, washed several times with water to remove the acid catalyst, and dried with anhydrous sodium sulphate. The solvent and other low molecular weight impurities were then removed under reduced pressure, yielding a colourless, viscous polymer.

100 grams (0.171 equivalents, both SH and COOH) of the described polymer was dissolved in toluene, and 28 grams (0.171 moles) of H.M.D.I. was added with stirring. The solution was heated under nitrogen for 2 hours, after which it was cooled, and then concentrated in vacuo to yield a straw-coloured viscous polymer with a large peak at 2265 nm in its infra-red spectrum.

This polymer was applied to wool fabric from perchloroethylene, followed by tumble drying and autoclaving at 15 p.s.i. for 5 minutes. The test results are shown in Table 19.

TABLE 19

Polymer XXI on wool fabric

| Polymer level | Area shrinkage (%) | |
|---|---|---|
|  | 1 hr wash | 3 hr wash |
| 1% | 2 | 5 |
| 2% | 0 | 1 |
| 3% | 0 | 0 |

Tables 20 and 21 show the results of further shrinkage and smooth drying tests on fabrics treated with polymers according to this invention.

TABLE 20

Area shrinkage of unbleached doctor flannel treated with various polymers

| Polymer No. | Area shrinkage % | | | | | |
|---|---|---|---|---|---|---|
|  | 1% polymer level | | 2% polymer level | | 3% polymer level | |
|  | 1 hr. | 3 hr. | 1 hr. | 3 hr. | 1 hr. | 3 hr. |
| XII | 1 | 4 | 0 | 1 | 0 | 0 |
| XIII | 3 | 7 | 0 | 1 | 0 | 1 |
| XIV | 6 | 11 | 3 | 7 | 1 | 3 |
| XV | 2 | 6 | 2 | 3 | 0 | 0 |
| XXI | 2 | 5 | 0 | 1 | 0 | 0 |
| Untreated | 53 | 65 | 53 | 65 | 53 | 65 |

TABLE 21

Smooth Drying Index (SDI) of wool serge treated with various polymers

| Polymer No. | SDI at 1% polymer 1 hr wash | SDI at 2% polymer 1 hr wash | SDI at 3% polymer 1 hr wash |
|---|---|---|---|
| XII | 2–3 | 3 | 3 |
| XIII | 2–3 | 3 | 3–5 |
| XIV | 2 | 2–3 | 3 |
| XXI | 2–3 | 3 | 3–3.5 |
| Untreated | 1 | 1 | 1 |

The following examples relate to polymers with terminal cross-linkable thiol groups.

EXAMPLE 20 (Polymer XXII)

Preparation 595 grams (0.296 mole) poly(tetramethylene oxide), molecular weight 2010 (Polymeg 2000), 20.7 grams (0.0987 mole) citric acid monohydrate, 100 ml toluene and 10 grams toluene-p-sulphonic acid monohydrate were refluxed with stirring under nitrogen, allowing water of reaction and hydration to collect in a Dean and Stark receiver. After 1½ hours, the predicted 8.1 ml water had collected, and 37.4 grams 97% thioglycollic acid (0.395 mole) (1% water by assay) was then admitted slowly to the reaction vessel and refluxing was continued. This second step produced 5.8 ml water, corresponding to the reaction of three hydroxyl groups with the thioglycollic acid. The reaction mixture was cooled, washed several times with water to remove excess acid, dried with magnesium sulphate, and then solvent and other low molecular weight impurities removed under reduced pressure. The yield of colourless polymer was 97% of theory.

Application to wool fabric 50 grams of the polymer was emulsified with 425 grams of water, using 25 grams non-ionic surfactant (Lissapol N). This stock emulsion was then used to make up mixtures of the following compositions. All concentrations are on a weight basis of pure solids.

Mixture 1 : 1% Polymer XXII + 3% KHCO$_3$ in water.
Mixture 2 : 2% Polymer XXII + 3% KHCO$_3$ in water.
Mixture 3 : 3% Polymer XXII + 3% KHCO$_3$ in water.
Mixture 4 : 2% Polymer XXII + 3% KHCO$_3$ + 0.2% polyamide/epichlorohydrin resin (Hercosett 57 - Hercules Powder Co.) in water.

These mixtures were subsequently padded (100% expression) onto 30 × 40 cm strips of fabric, using a laboratory pad mangle.

The fabrics used were worsted serge of 13/14 oz per running yard (270 g/m²) and "doctor" flannel (plain weave woollen fabric 185 g/m²).

After being padded, the fabric was dried at 100° C for 15 minutes in a forced-air oven, and then left at room temperature overnight. The alkali and surfactant were then removed by giving the fabric three 15-minute washes in water in a laboratory dolly-washer. The process was completed by allowing the fabric to dry in air at room temperature, followed by full-decatising (high temperatures team flat-setting) between cotton wrappers in a vacuum autoclave using 15 lb/in$^2$ gauge steam pressure for 5 min.

Results

The wash test results for treated and untreated fabrics are given in Table 22.

ple 1. The results from tests on the treated fabrics are given in Tables 24 and 25. The results of different washing tests in Table 25 were obtained with fabrics treated with emulsions containing 2% $KHCO_3$. Except where otherwise indicated washing was for 3 hours in 15 liters (Cubex machine).

Table 23

| Polyether glycols esterified with citric acid and thioglycollic acid in the preparation of Polymers XXIII to XXVII | |
|---|---|
| Polymer No. | Polyether glycol |
| XXIII | Polymeg 1000 |
| XXIV | Polymeg 1000 (a) |
| XXV | Polymeg 650 |
| XXVI | Poly (hexamethylene oxide) 1210 (b) |
| XXVII | Poly (propylene oxide) diol (c) |

TABLE 22

Polymer XXII on Serge

| | % Area Shrinkage | | Smooth Drying Index | | % Crease Retention | | Cuff Shrinkage | |
|---|---|---|---|---|---|---|---|---|
| Polymer Level | 1 hr wash | 3 hr wash | 1 hr wash | 3 hr wash | 1 hr wash | 3 hr wash | 1 hr wash | 3 hr wash |
| 1% | 1 | 1 | 3 | 1-2 | 65 | 65 | Pass | Pass |
| 2% | 1 | 1 | 3 | 2-3 | 67 | 65 | Pass | Pass |
| 3% | 0 | 0 | 3.5 | 3-3.5 | 70 | 68 | Pass | Pass |
| 2% (+ 0.2% Hercosett 57) | 1 | 1 | 3 | 3 | 75 | 69 | Pass | Pass |
| Untreated | 12 | 25 | 1 | 1 | 0 | 0 | Fail | Fail |

Polymer XXII on Doctor Flannel

| | % Area Shrinkage | | Smooth Drying Index | | Differential Shrinkage (%) of Samples exposed to Std. 6. | | |
|---|---|---|---|---|---|---|---|
| Polymer Level | 1 hr wash | 3 hr wash | 1 hr wash | 3 hr wash | 1 hr wash | 2 hr wash | 3 hr wash |
| 1% | 2 | 5 | 2-3 | 2-3 | — | — | — |
| 2% | 1 | 1 | 3 | 3 | 0 | 1 | 1 |
| 3% | 1 | 1 | 3 | 3 | 0 | 0 | 1 |
| 2% (+ 0.2% Hercosett 57) | 1 | 1 | 3 | 3 | 0 | 1 | 1 |
| Untreated | 53 | 65 | 1 | 1 | — | — | — |

EXAMPLE 21 (Polymers XXIII to XXVII)

The method and mole ratios for the preparation of Polymer XXII were repeated to prepare Polymers XXIII to XXVII. The polyether starting materials used in these preparations are listed in Table 23.

(a) xylene (mixed isomers) used as solvent, in place of toluene, in case of Polymer XXIV. This provides for a shorter reaction time (saving of 30%) but yields a darker polymer.
(b) This was prepared as described in Example 14.
(c) Propylan D100 - Lankro Chemicals Ltd. This polymer has branched alkylene groups and was prepared as a comparative example.

TABLE 24

Polymer XXIII on Serge

| | % Area Shrinkage | | Smooth Drying Index | | % Crease Retention | | Cuff Shrinkage | |
|---|---|---|---|---|---|---|---|---|
| Polymer Level | 1 hr wash | 3 hr wash | 1 hr wash | 3 hr wash | 1 hr wash | 3 hr wash | 1 hr wash | 3 hr wash |
| 1% | 1 | 3 | 2-3 | 2 | 64 | 56 | Fail | Fail |
| 2% | 0 | 1 | 3 | 3 | 67 | 67 | Pass | Pass |
| 3% | 1 | 1 | 3.5 | 3.5 | 70 | 69 | Pass | Pass |
| 2% (+ 0.2% Hercosett 57) | 1 | 1 | 3 | 3 | 72 | 71 | Pass | Pass |
| Untreated | 12 | 25 | 1 | 1 | 0 | 0 | Fail | Fail |

Polymer XXIII on Doctor Flannel

| | % Area Shrinkage | | Smooth Drying Index | | Differential Shrinkage (%) of Light-Exposed Samples | | | |
|---|---|---|---|---|---|---|---|---|
| | | | | | Standard 6 | | Standard 7 | |
| Polymer Level | 1 hr wash | 3 hr wash | 1 hr wash | 3 hr wash | 1 hr wash | 3 hr wash | 1 hr wash | 3 hr wash |
| 1% | 3 | 10 | 2-3 | 2-3 | — | — | — | — |
| 2% | 1 | 1 | 3 | 3 | 0 | 1 | 0 | 1 |
| 3% | 0 | 0 | 3 | 3 | 0 | 0 | 0 | 1 |
| 2% (+ 0.2% Hercosett 57) | 1 | 1 | 3 | 3 | 0 | 1 | 0 | 1 |
| Untreated | 53 | 65 | 1 | 1 | — | — | — | — |

The application of the polymers to wool from aqueous emulsions (3% $KHCO_3$) was as described in Exam-

TABLE 25

| Effect of Different Washing Conditions and Detergents on Fabric treated with Polymer XXIII | | | | | | |
|---|---|---|---|---|---|---|
| Wash Liquor | | | Area Shrinkage (%) | | Smooth Drying under | |
| | | | (Doctor Flannel) | | (Grey Serge) | |
| Composition | pH | Temp ° C | 2% polymer | 3% polymer | 2% polymer | 3% polymer |
| Phosphate buffer Detergent (Ariel Base), | 7 | 40 | 1 | 0 | 3 | 3.5 |

TABLE 25-continued

Effect of Different Washing Conditions and Detergents on Fabric treated with Polymer XXIII

| Wash Liquor | | | Area Shrinkage (%) (Doctor Flannel) | | Smooth Drying under (Grey Serge) | |
|---|---|---|---|---|---|---|
| Composition | pH | Temp °C | 2% polymer | 3% polymer | 2% polymer | 3% polymer |
| 5 g/l Detergent (Ariel Base), | 10 | 40 | 1 | 0 | 3 | 3.5 |
| 5 g/l + sodium perborate, 1 g/liter | 10 | 40 | 0 | 0 | 3 | 3.5 |
| Detergent (Dreft), 5 g/liter | 8 | 40 | 0 | 0 | 3 | 3.5 |
| Detergent (Stergene), 5 g/liter | 10 | 40 | 1 | 0 | 3 | 3.5 |
| Soap Flakes (Flanola), 5 g/liter | 10 | 40 | 1 | 0 | 3 | 3.5 |
| Soap Powder (Persil), 3 g/liter + Sodium Carbonate, 1.5 g/liter) | 10 | 40 | 1 | 0 | | |
| Soap Powder (Persil), 3 g/liter + Sodium Carbonate, 1.5 g/liter) | 10 | 60 | 2 | 1 | | |
| Enzyme detergent (Biotex), 3 g/liter: soak 2 hr. (40° C) followed by 3 hr. wash in phosphate buffer, pH 7, 40° C. | 10/7 | 40 | 3 | 2 | | |

The words "Ariel", "Dreft", "Stergene", "Flanola", "Persil" and "Biotex" are Trade Marks.

EXAMPLE 22 (Polymer XXVIII)

The method and mole ratios for the preparation of Polymer XXVIII were repeated to prepare Polymer XXVII, except that the polymer was "capped" with 2-mercaptocussinic acid instead of thioglycollic acid. An aqueous emulsion of this polymer gives a solution of the sodium salt when diluted with sodium carbonate solution.

The polymer was applied to wool fabric from a 2% sodium carbonate solution and was cured by drying at 120° C for 10 minutes. The remainder of the fabric finishing process as described in Example 20. The results of shrinkage tests are shown in Table 26, the wash test being conducted in 15 liters of pH 7 buffer (Cubex machine).

Table 26

Various polymers on wool fabric

| Polymer | Area shrinkage at 1% polymer level | | Area shrinkage at 2% polymer level | | Area shrinkage at 3% polymer level | |
|---|---|---|---|---|---|---|
| | 1 hr wash | 3 hr | 1 hr | 3 hr | 1 hr | 3 hr |
| XXIV | 2 | 8 | 1 | 1 | 0 | 0 |
| XXV | 2 | 7 | 1 | 1 | 0 | 0 |
| XXVI | 3 | 10 | 0 | 1 | 0 | 0 |
| XXVII | 6 | 43 | 0 | 2 | 0 | 0 |
| XXVIII | 1 | 3 | 0 | 0 | 0 | 0 |
| Nil | 53 | 65 | 53 | 65 | 53 | 65 |

EXAMPLE 23 (Polymer XXIX)

4.55 grams (0.0494 mole) dried glycerol, 29.96 grams (0.1481 mole) sebacic acid, 4 grams p-toluene sulphonic acid monohydrate, and 50 ml toluene were refluxed under nitrogen with stirring, 2.8 ml water being removed azeotropically over a period of 1 hour. 150 grams (0.1481 mole) Polymeg 1000 (molecular weight 1013) was then added to the reaction mixture and refluxing continued until water stopped distilling over, at which point 2.6 ml had been collected. Finally, 16 grams (11% excess) thioglycollic acid (see Example 1) was admitted to the reaction vessel and heating continued, producing a further 2.7 ml of water.

The reaction mixture was worked up by the method described in Example 20, the yield of colourless polymer being 93% of theory. Polymer XXIX was emulsified and applied as in Example 20, and the treated wool fabric was evaluated for shrink-resistance and smooth drying index. The results are in Table 27.

Table 27

Polymer XXIX on wool fabrics

| Polymer level | % Area Shrinkage (doctor Flannel) | | Smooth drying index (serge) | |
|---|---|---|---|---|
| | 1 hr. wash | 3 hr. wash | 1 hr. wash | 3 hr. wash |
| 1% | 0 | 3 | 2–3 | 3 |
| 2% | 0 | 3 | 2–3 | 2 |
| 3% | 0 | 0 | 3 | 2–3 |
| Untreated | 53 | 65 | 1 | 1 |

EXAMPLE 24 (Polymer XXX)

The preparation of Polymer XXX was the same as that of Polymer XXIX, except that 21.64 grams (0.1481 mole) adipic acid replaced the sebacic acid.

The application of the polymer to wool fabric was from aqueous emulsion (containing 3% $KHCO_3$) and the results of fabric performance are in Table 28.

TABLE 28

Polymer XXX on wool fabrics

| Polymer Level | % Area Shrinkage (Doctor flannel) | | Smooth Drying Index (serge) | |
|---|---|---|---|---|
| | 1 hr. wash | 3 hr. wash | 1 hr. wash | 3 hr. wash |
| 1% | 10 | 27 | 1–2 | 1 |
| 2% | 0 | 3 | 3 | 2 |
| 3% | 0 | 2 | 3 | 2–3 |
| Untreated | 53 | 65 | 1 | 1 |

EXAMPLE 25 (Polymer XXXI)

A mixture of 17.5 grams (0.1481 mole) succinic acid, 9.8 grams toluene-p-sulphonic acid monohydrate, 80 ml toluene and 10 ml dimethylformamide was stirred with reflux under nitrogen, employing a Dean and Stark trap to collect the azeotropically removed water.

A solution of 6.62 grams tris(hydroxymethyl) propane in 10 ml water was added dropwise to the reaction vessel over a period of 1½ hours. After a further hour's refluxing, the total volume of water which had been collected was 13.50 ml. Allowing for the 0.93 ml water of hydration from the catalyst, this gives the water of condensation as 2.57 ml, which is 96% of theory.

The reaction mixture was allowed to cool slightly, and 150 grams Polymeg 1013 was added. Refluxing for 1 hour yielded 2.55 ml water, which again is 96% of theory. 16 grams thioglycollic acid was then admitted, and refluxing yielded a further 2.55 ml water.

The reaction mixture was worked up in the usual way (see Example 1), and the yield of pale yellow polymer was 162 g. The polymer was applied to wool fabric from an aqueous emulsion containing (3% $KHCO_3$) and the results of wash tests are in Table 29.

TABLE 29

| | Polymer XXXI on wool fabrics | | | |
|---|---|---|---|---|
| | % Area Shrinkage (Doctor Flannel) | | Smooth Drying Index (Serge) | |
| Polymer Level | 1 hr wash | 3 hr wash | 1 hr wash | 3 hr wash |
| 1% | 2 | 13 | 2 | 2 |
| 2% | 2 | 11 | 3 | 2–3 |
| 3% | 2 | 12 | 3 | 2–3 |
| Untreated | 53 | 65 | 1 | 1 |

EXAMPLE 26 (Polymer XXXII)

The method described in Example 23 was followed, using as reactants in the first stage 6.62 grams (0.0494 mole) tris(hydroxymethyl)propane and 21.64 grams (0.1481 mole) adipic acid. All reaction stages went to completion, and the yield of colourless polymer was 95% of theory.

The polymer was applied to wool fabric from aqueous emulsion (containing 3% $KHCO_3$) and the curing and testing was as described in Example 20. The results are in Table 30.

TABLE 30

| | Polymer XXXII on wool fabrics | | | |
|---|---|---|---|---|
| | % Area Shrinkage (doctor flannel) | | Smooth Drying Index (serge) | |
| Polymer Level | 1 hr wash | 3 hr wash | 1 hr wash | 3 hr wash |
| 1% | 2 | 14 | 2–3 | 2 |
| 2% | 1 | 7 | 3 | 2 |
| 3% | 0 | 1 | 3.5 | 3–3.5 |
| Untreated | 53 | 65 | 1 | 1 |

EXAMPLE 27 (Polymer XXXIII)

The procedure in Example 23 was followed, using as first stage reactants, 6.62 grams (0.0494 mole) tris(hydroxymethyl)propane and 30 grams (0.1483 mole) sebacic acid. The predicted volumes of water were collected at each stage, and the yield of colourless polymer was 97% of theory.

The polymer was applied to wool and tested as in Example 3. The results are in Table 31.

TABLE 31

| | Polymer XXXIII on wool fabrics | | | |
|---|---|---|---|---|
| Polymer Level | Area Shrinkage % | | Smooth Drying Index | |
| | 1 hr. wash | 3 hr. wash | 1 hr. wash | 3 hr. wash |
| 1% | 6 | 40 | 2–3 | 1 |
| 2% | 0 | 0 | 3 | 2–3 |
| 3% | 0 | 0 | 3 | 2–3 |
| Untreated | 53 | 68 | 1 | 1 |

EXAMPLE 28 (Polymers XXXIV–XLIV)

A mixture of 100 grams (0.0995 mole) of a polytetramethyleneether glycol of molecular weight 1005 ("Polymeg 1000" — Quaker Oats Ltd.), 29.9 gram (0.199 mole) of 2-mercaptosuccinic acid, 50 mls. of toluene, and 2 grams of toluene-4-sulphonic acid monohydrate was refluxed with stirring under nitrogen, with water of reaction and hydration being removed by azeotropic distillation. After 1 hour, the predicted 3.8 mls of water had accummulated in the Dean and Stark receiver, and no more was observed to distil over during the next 30 minutes. The reaction mixture was cooled, further diluted with toluene, washed several times with water to remove the acid catalyst, and dried with anhydrous sodium sulphate. The solvent and other low molecular weight impurities were then removed under reduced pressure, yielding a colourless, viscous polymer in 97% yield.

A stock emulsion was prepared using 50 grams of polymer, 25 grams of a 50% aqueous solution of a polyoxyethylene alkylphenol surfactant (Lissapol N - I.C.I.), and 175 grams of water. This 20% solids emulsion was used to prepare working strength baths for the application of the polymer to the desired substrate. In cases where the pH of the bath was 8 or above, a clear solution with a purple tinge resulted.

Application baths of pH8 and above could be prepared also by direct dissolution in the alkaline bath of a concentrate of the following composition by weight:
Polymer . . . 85%
Isopropanol . . . 10%
Surfactant . . . 5%

Table 32 describes a range of polymers prepared by the method described above, the molar ratio of Polymeg 1000 to 2-mercaptosuccinic acid being varied through the series.

TABLE 32

| Polymer | Molar Ratio of Polymeg 1000 to 2-mercaptosuccinic acid | Nominal average mercapto functionality |
|---|---|---|
| XXXIV | 1:2 | 2 |
| XXXV | 1:1.80 | 2.25 |
| XXXVI | 1:1.67 | 2.50 |
| XXXVII | 1:1.57 | 2.75 |
| XXXVIII | 1:1.50 | 3 |
| XXXIX | 1:1.40 | 3.5 |
| XL | 1:1.33 | 4 |
| XLI | 1:1.29 | 4.5 |
| XLII | 1:1.25 | 5 |
| XLIII | 1:1.2 | 6 |
| XLIV | 1:1.14 | 8 |

Polymers XXXIV to XLIV were soluble in aqueous baths of pH 10 and were applied to wool fabric from such baths. They could be cured by heating at 100° C for 10 minutes in a forced-air oven.

Test results, following application to fabrics are given in Tables 33 to 36.

In Table 33 are given the results of tests on fabrics applied by padding at 100% uptake with polymer solutions containing 2% $Na_2CO_3$, drying and after washing. The washes werre conducted in 15 liters of pH 7 buffer (Cubex machine).

TABLE 33

| | Polymers XXXIV to XLIV on unbleached Doctor Flannel. | | | | | |
|---|---|---|---|---|---|---|
| | Area Shrinkage (%) with 1% polymer | | Area Shrinkage (%) with 2% polymer | | Area Shrinkage (%) with 3% polymer | |
| Polymer | 1 hr. wash | 3 hr. wash | 1 hr. wash | 3 hr. wash | 1 hr. wash | 3 hr. wash |
| XXXIV | 2 | 9 | 1 | 1 | 0 | 1 |
| XXXV | 3 | 16 | 2 | 4 | 0 | 0 |
| XXXVI | 1 | 6 | 0 | 1 | 0 | 2 |
| XXXVII | 2 | 4 | 0 | 1 | 0 | 1 |

TABLE 33-continued

Polymers XXXIV to XLIV on unbleached Doctor Flannel.

| Polymer | Area Shrinkage (%) with 1% polymer | | Area Shrinkage (%) with 2% polymer | | Area Shrinkage (%) with 3% polymer | |
|---|---|---|---|---|---|---|
| | 1 hr. wash | 3 hr. wash | 1 hr. wash | 3 hr. wash | 1 hr. wash | 3 hr. wash |
| XXXVIII | 0 | 1 | 0 | 0 | 0 | 0 |
| XXXIX | 0 | 1 | 0 | 0 | 0 | 0 |
| XL | 0 | 1 | 0 | 0 | 0 | 0 |
| XLI | 0 | 0 | 0 | 0 | 0 | 0 |
| XLII | 0 | 1 | 0 | 1 | 0 | 0 |
| XLIII | 1 | 3 | 1 | 2 | 1 | 0 |
| XLIV | 1 | 2 | 0 | 1 | 0 | 1 |

In Table 34, results are given for tests carried out on fabrics padded with polymer solutions containing 2% Na$_2$CO$_3$, dried at 100° C, afterwashed, and autoclaved as in Example 20. Creases were applied with 2% mono-ethanolamine sesquisulphite (MEAS) + 2% MEA and pressed on a 20 sec. steam/20 sec. bake/10 sec. vacuum cycle. Washes were conducted in 15 liters of pH 7 buffer (Cubex machine).

TABLE 34

Polymers XXXVIII and XL on wool serge.

| Polymer Level | Polymer XXXVIII Crease Retention (%) | | Polymer XL Crease Retention (%) | |
|---|---|---|---|---|
| | 1 hr wash | 3 hr wash | 1 hr wash | 3 hr wash |
| 1% | 78 | 75 | 75 | 72 |
| 2% | 77 | 78 | 83 | 80 |
| 3% | 83 | 81 | 83 | 82 |
| Untreated | 0 | 0 | 0 | 0 |

In Table 35 are given results of cuff-edge felting tests on grey serge fabric padded in polymer solutions containing 2% Na$_2$CO$_3$, dried at 100° C, afterwahsed and autoclaved. Simulated trouser cuffs were tailored from the fabric samples and creases set with 2% MEAS + 2% MEA using a 20 sec. steam/20 sec. bake/10 sec. vacuum pressing cycle. Washes were conducted in 15 liters of pH9 buffer (Cubex machine).

TABLE 35

Polymers XXXVIII and XL Grey Serge Fabric Performance of Cuffs

| Polymer Level | Polymer XXXVIII | | Polymer XL | |
|---|---|---|---|---|
| | 1 hr wash | 3 hr wash | 1 hr wash | 3 hr wash |
| 1% | Pass | Pass | Pass | Pass |
| 2% | Pass | Pass | Pass | Pass |
| 3% | Pass | Pass | Pass | Pass |
| Untreated | Fail | Fail | Fail | Fail |

Table 36 shows the extra linear shrinkage on washing brought about by exposure to light to blue Standards 6 and 7 and represents the difference between the shrinkage of an irradiated and washed sample and that of a washed unirradiated sample. The polymers were applied by padding from an aqueous solution containing 2% Na$_2$CO$_3$, drying at 100° C, washing and autoclaving. The wash tests were carried out in 15 liters of pH 7 buffer (Cubex machine).

TABLE 36

Polymers XL and XLIV on Unbleached Doctor Flannel.
Differential Shrinkage (%)

| Polymer Level | Standard 6 | | Standard 7 | |
|---|---|---|---|---|
| | 1 hr. wash | 3 hr. wash | 1 hr. wash | 3 hr. wash |
| 2% Polymer XL | 0 | 0 | 1 | 2 |
| 3% Polymer XL | 0 | 1 | 0 | 1 |
| 2% Polymer XLIV | 1 | 2 | 1 | 2 |
| 3% Polymer XLIV | 1 | 1 | 0 | 1 |

EXAMPLE 29 (Polymers XLV - XLIX)

Table 37 describes polymers prepared by the method of Example 28, using 2-mercaptosuccinic acid and various glycols. It was found that no washing was required if the polymer was not to be subsequently emulsified, and this simplified the process.

TABLE 37

| Polymer No. | Glycol reactant | Molar ratio (glycol/diacid) | Nominal Average Mercapto functionality |
|---|---|---|---|
| XLV | Polymeg 650 | 1:1.5 | 3 |
| XLVI | Polymeg 2000 | 1:1.5 | 3 |
| XLVII | Poly(hexamethylene oxide) (a) | 1:1.33 | 4 |
| XLVIII | Poly(propylene oxide) diol 1000 (b) | 1:1.33 | 4 |
| XLIX | Triethylene glycol | 1:1.33 | 4 |

(a) Poly(hexamethylene oxide) was prepared as described in Example 14.
(b) Propylan D1000 (Lankro Chemicals Ltd), polymer with branched alkylene groups prepared as comparative example.
Polymers XLV – XLIX can be applied to wool fabric at pH10, from aqueous emulsion or solution, followed by curing for 10 minutes at 120° C in a forced-air oven.

EXAMPLE 30 (Polymer L)

200 grams (0.199 mole) of Polymeg 1000, 44.8 grams (0.299 mole), 2-mercaptosuccinic acid and 50 grams of toluene, were reacted under nitrogen, using as a catalyst 10 grams of an ion-exchange resin (Zeocarb 225) in dried acid form and removing the water of reaction azeotropically. The reaction was complete in 6 hours, and the polymer was worked up as in Example 20, and could be applied to wool fabric at pH 10, with curing at 120° C/10 minutes. Shrinkage test results are given in Table 38.

EXAMPLE 31 (Polymer LI)

A mixture of 136 grams (0.135 mole) of Polymeg 1000, 13.5 grams (0.090 mole) of 2-mercaptosuccinic acid, 2 grams of toluene-4-sulphonic acid/monohydrate and 200 mls of toluene was refluxed under nitrogen with stirring, and the water of reaction and hydration was removed azeotropically. When the predicted volume of water had been collected in a Dean and Stark receiver, 9 grams (0.098 mole) of thioglycollic acid was added, and the mixture further refluxed to esterify the remaining hydroxyl groups. The reaction mixture was worked up as in Example 20, and yielded 135 grams (88% of theory) of a colourless, viscous polymer. This polymer was not soluble in a pH 10 aqueous bath, but could be applied as an emulsion followed by drying at 120° C for 10 minutes. The results of wash tests are given in Tables 38 and 41.

EXAMPLE 32 (Polymer LII)

The procedure of Example 31 was followed, using the following reactants:
125 grams (0.124 mole) Polymeg 1000 (m.w. 1010)
27.6 grams (0.041 mole) Polymeg 650 (m.w. 670)
18.6 grams (0.124 mole) 2-mercaptosuccinic acid
4 grams toluene-p-sulphonic acid
100 mls toluene
8.6 grams (0.093 mole) thioglycollic acid The yield of colourless polymer was 170.3 grams (98% of theory). This polymer was insoluble in ph10 aqueous baths, but could be applied as an emulsion at pH 10 and cured at 120° C/10 minutes. The results are given in Table 38.

EXAMPLE 33 (Polymer LIII)

The procedure of Example 31 was followed, using the following reactants:
150 grams (0.0746 mole) Polymeg 2000 (m.w. 2010)
5.6 grams (0.0373 mole) 2-mercaptosuccinic acid
4 grams toluene-p-sulphonic acid
100 mls toluene
7.6 grams (0.083 mole) thioglycollic acid The colourless, viscous polymer obtained was insoluble in pH 10 aqueous baths, but could be applied from an emulsion at pH 10, and could be cured by heating the fabric at 120° C for 10 minutes.

The results are given in Table 38.

EXAMPLE 34 (Polymer LIV)

200 grams (0.199 moles) of Polymeg 1000 (molecular weight 1005), 44.8 grams (0.299 moles) of 2-mercaptosuccinic acid, 8 grams of toluene-4-sulphonic acid monohydrate, and 50 grams of toluene were reacted under nitrogen until 7.9 mls of water had been removed azeotropically. 14.4 grams (0.10 mole) of nonan-1-ol was then added, and the mixture refluxed until an extra 1.8 mls of water had been collected. The reaction mixture was worked up s in Example 1, to yield a colourless polymer.

This could be applied to wool fabric from an aqueous bath at pH 10, and cured by heating for 10 minutes at 120° C. The results of wash tests are given in Table 38.

Table 38 gives the results of shrinkage tests, upon washing in 15 liters pH 7 buffer (Cubex machine). The polymers in this case were applied by padding with 2% Na$_2$CO$_3$ (on weight of fabric), drying and afterwashing.

Table 39 gives the results of light fastness tests of polymers XXVII and XLVIII (using a branched chain polyoxypropylene diol) and of polymers XXXIII and XL using unbranched polyoxybutylene chains. 3% polymer by weight of the fabric was applied. It can be seen that the polymers according to the invention are very much more stable to exposure to light.

TABLE 39

Lightfastness of various thiol polymers on wool fabric.

| Polymer | Differential Warp shrinkage (%) after exposure to light | | | | | |
|---|---|---|---|---|---|---|
| | Standard 5 | | Standard 6 | | Standard 7 | |
| | 1 hr | 3 hr | 1 hr | 3 hr | 1 hr | 3 hr |
| Polymer XXIII | 0 | 0 | 0 | 0 | 0 | 1 |
| Polymer XXVII | 2 | 8 | 8 | 22 | 9 | 20 |
| Polymer XL | 0 | 0 | 0 | 1 | 0 | 1 |
| Polymer XLVIII | 3 | 8 | 8 | 17 | 10 | 18 |

Table 40 shows the effect of different washing conditions on fabrics treated with Polymers XXXIX and XLVI.

The polymers were applied by padding to apply 2% polymer with 2% Na$_2$CO$_3$ on the weight of fabric, drying at 100° C and afterwashing. Test washing was performed in 15 liters pH 7 buffer (Cubex machine) for the times indicated.

TABLE 40

Polymers XXXIX and XLVI on wool fabric

| Wash liquor Composition | pH | Temp °C | Area Shrinkage (%) | |
|---|---|---|---|---|
| | | | Polymer XXXIX | Polymer XLIV |
| Phosphate buffer 0.1M | 7 | 40 | 0 | 0 |
| Ariel Base (5 g/l) | 10 | 40 | 0 | 0 |
| Ariel Base (5 g/l) + sodium perborate (1 g/l) | 10 | 40 | 0 | 0 |
| Dreft (5 g/l) | 8 | 40 | 0 | 0 |
| Stergene (5 g/l) | 10 | 40 | 0 | 0 |
| Soap Flakes (5 g/l) (Flanola) | 10 | 40 | 0 | 0 |
| Persil (3 g/liter) + Sodium carbonate (1.5 g/l) | 10 | 40 | 0 | 0 |
| Persil (3 g/liter) + Sodium carbonate (1.5 g/l) | 10 | 60 | 1 | 0 |
| Biotex (3 g/l) soak 2 hrs. (40° C) followed by 3 hr. wash in phosphate buffer, pH 7, 40° C | 10/7 | 40 | 2 | 4 |

Table 41 shows the smooth drying index of grey serge treated with Polymers XXXVIII, XL and LI after test washes in 15 liters pH 7 buffer (Cubex machine). The polymer-treated samples were prepared by padding together with 2% Na$_2$CO$_3$ (on weight of fabric), drying at 100° C, washing and autoclaving.

TABLE 38

Various thiol polymers on wool fabric.

| Polymer No. | Area shrinkage at 1% polymer level | | Area shrinkage at 2% polymer level | | Area shrinkage at 3% polymer level | |
|---|---|---|---|---|---|---|
| | 1 hr wash | 3 hr wash | 1 hr wash | 3 hr wash | 1 hr wash | 3 hr wash |
| XLV | 0 | 2 | 0 | 1 | 0 | 0 |
| XLVI | 0 | 3 | 0 | 0 | 0 | 0 |
| XLVII | 0 | 3 | 0 | 1 | 0 | 1 |
| XLVIII | 6 | 13 | 0 | 3 | 0 | 0 |
| XLIX | | | 2 | 5 | | |
| L | 0 | 2 | 0 | 0 | 0 | 0 |
| LI | 0 | 5 | 0 | 1 | 0 | 0 |
| LII | 1 | 4 | 0 | 1 | 0 | 0 |
| LIII | 2 | 8 | 0 | 1 | 0 | 0 |
| LIV | 0 | 2 | 0 | 0 | 0 | 0 |

TABLE 41

| | Polymers XXXVIII, XL and LI on grey serge | | | | | |
|---|---|---|---|---|---|---|
| | AATCC Permanent Press Rating (1 lowest, 5 highest) | | | | | |
| Polymer | Polymer XXXVIII | | Polymer XL | | Polymer LI | |
| Level | 1 hr wash | 3 hr wash | 1 hr wash | 3 hr wash | 1 hr wash | 3 hr wash |
| 1% | 3 | 2 | 3 | 3 | 3 | 2 |
| 2% | 3.5 | 3–3.5 | 3.5 | 3.5 | 3.5 | 3 |
| 3% | 3.5 | 3.5 | 3.5 | 3.5 | 3.5 | 3.5 |
| Untreated | 1 | 1 | 1 | 1 | 1 | 1 |

EXAMPLE 35

Curing of Polymer XL on wool fabric

Fabric (doctor flannel and serge) was treated with 2% Polymer XL as described in Example 28, but cured as set out in Table 42. The fabric so cured was left overnight, then washed off, dried, flat-set and wash tested, the results appearing in Table 42.

TABLE 42

| | Polymer XL on wool fabric | | |
|---|---|---|---|
| | | 3 hour wash test | |
| | Curing time | Area | Smooth drying |
| Curing agent | and temp. | shrinkage | Index |
| 1% Na$_2$CO$_3$ | 10 min/130° C | 1% | 3.5 |
| | 10 min/100° C | 1% | 3.5 |
| | 10 min/75° C | 1% | 3.5 |
| | overnight/20° C | 1% | 3.5 |
| 3% Na$_2$CO$_3$ | 10 min/130° C | 1% | 3.5 |
| | 10 min/100° C | 2% | 3.5 |
| | 10 min/75° C | 0% | 3.5 |
| | overnight/20° C | 1% | 3.5 |

We claim:

1. A compound having the structural formula:

$$\text{HOOC}-\underset{\underset{R''}{|}}{R'}-\text{COO}-\left[(C_mH_{2m}O)_n-\text{OC}-\underset{\underset{R''}{|}}{R'}-\text{COO}\right]_x-H$$

wherein R' is an alkylene group; R'' is a thiol group; x is at least 1; $C_mH_{2m}O$ is a straight chain oxyalkylene group; n is greater than 1, and m is at least 3.

2. A curable compound as claimed in claim 1 where n is greater than 5.

3. A curable compound as claimed in claim 1 wherein n is between 10 and 15.

4. A curable compound as claimed in claim 1 wherein m is 4.

5. A curable compound as claimed in claim 1 wherein x is not greater than 6.

6. A curable compound according to claim 1 wherein —$C_mH_{2m}$— is tetramethylene and $$-\text{COO}-\underset{\underset{R''}{|}}{R'}-\text{COO}-$$

is the residue of mercaptosuccinic acid.

* * * * *